(12) United States Patent
Kominato

(10) Patent No.: US 11,220,211 B2
(45) Date of Patent: Jan. 11, 2022

(54) LIGHT EMITTING DEVICE

(71) Applicant: Yazaki Corporation, Tokyo (JP)

(72) Inventor: Yasuhiro Kominato, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 16/845,385

(22) Filed: Apr. 10, 2020

(65) Prior Publication Data

US 2020/0361373 A1 Nov. 19, 2020

(30) Foreign Application Priority Data

May 15, 2019 (JP) .............................. JP2019-092375

(51) Int. Cl.
| | |
|---|---|
| *B60Q 3/70* | (2017.01) |
| *B60N 2/90* | (2018.01) |
| *B60N 2/07* | (2006.01) |
| *B60N 2/08* | (2006.01) |
| *F21V 14/00* | (2018.01) |
| *F21V 21/34* | (2006.01) |
| *F21Y 115/10* | (2016.01) |

(52) U.S. Cl.
CPC ............. *B60Q 3/70* (2017.02); *B60N 2/0722* (2013.01); *B60N 2/08* (2013.01); *B60N 2/90* (2018.02); *F21V 14/00* (2013.01); *F21V 21/34* (2013.01); *F21Y 2115/10* (2016.08)

(58) Field of Classification Search
None
See application file for complete search history.

(56) References Cited

U.S. PATENT DOCUMENTS

| | | | | |
|---|---|---|---|---|
| 2,635,681 A | * | 4/1953 | Hiltman | ................... G09F 23/00 |
| | | | | 297/217.6 |
| 4,195,330 A | | 3/1980 | Savage, Jr. | |
| 4,398,240 A | | 8/1983 | Savage, Jr. | |
| 4,402,110 A | | 9/1983 | Savage, Jr. | |
| 5,004,908 A | * | 4/1991 | Nakamura | ................ G01V 8/12 |
| | | | | 250/221 |
| 5,272,892 A | * | 12/1993 | Janutka | ................... D06F 39/087 |
| | | | | 68/12.02 |
| 5,937,578 A | * | 8/1999 | Dolan | ....................... E05F 15/43 |
| | | | | 49/26 |

(Continued)

FOREIGN PATENT DOCUMENTS

| | | |
|---|---|---|
| DE | 2447423 A1 | 4/1976 |
| FR | 2426304 A1 | 12/1979 |

(Continued)

*Primary Examiner* — Elmito Breval
(74) *Attorney, Agent, or Firm* — Banner & Witcoff, Ltd.

(57) ABSTRACT

A light emitting device includes a light emitter, a holding portion that slidably holds the light emitter inside a slide rail for a vehicle, and a light transmissive cover that covers the light emitter. According to a configuration, the cover of the light emitting device prevents a decrease in a communication performance of a signal transmission and reception device in which information on an electronic device is transmitted using an LED, as compared with a related art in which the communication performance decreases due to influence of scattering or shielding a light of the LED, the influence being caused by a grease which is heavily applied inside a slide rail of a vehicle and adheres to the LED.

10 Claims, 7 Drawing Sheets

(56) References Cited

U.S. PATENT DOCUMENTS

| | | | | |
|---|---|---|---|---|
| 6,145,996 | A * | 11/2000 | Shimada | F21S 2/00 362/146 |
| 6,509,561 | B1 * | 1/2003 | Scott | G01V 8/12 250/239 |
| 7,719,696 | B1 * | 5/2010 | Nakayashiki | B65H 23/0216 356/614 |
| 9,033,390 | B1 * | 5/2015 | Ksiezopolski | B60R 13/06 296/26.13 |
| 9,644,828 | B1 * | 5/2017 | May | H01R 33/94 |
| 9,644,836 | B1 * | 5/2017 | Field | F21V 5/04 |
| 2006/0004518 | A1 * | 1/2006 | Sleboda | B60R 21/01532 701/300 |
| 2006/0087851 | A1 | 4/2006 | Dubord | |
| 2008/0116707 | A1 * | 5/2008 | Boaz | B60J 10/00 296/26.01 |
| 2008/0239730 | A1 * | 10/2008 | Chien | F21L 14/02 362/368 |
| 2014/0206302 | A1 * | 7/2014 | Terada | B60N 2/0715 455/90.1 |
| 2015/0085519 | A1 * | 3/2015 | Ammar | B60N 2/58 362/581 |
| 2015/0146433 | A1 * | 5/2015 | Suzuki | G02B 6/0006 362/311.01 |
| 2016/0201893 | A1 * | 7/2016 | Ksiezopolski | E04B 1/6815 362/311.02 |
| 2016/0207438 | A1 * | 7/2016 | Ksiezopolski | F16J 15/104 |
| 2018/0252400 | A1 * | 9/2018 | Goerts | F21V 27/02 |
| 2019/0145611 | A1 * | 5/2019 | May | F21S 8/04 362/147 |
| 2019/0249854 | A1 * | 8/2019 | Shen | F21V 23/0435 |

FOREIGN PATENT DOCUMENTS

| | | |
|---|---|---|
| FR | 2956908 A1 | 9/2011 |
| FR | 2958008 A1 | 9/2011 |
| JP | 2006-139690 A | 6/2006 |
| JP | 2010-158968 A | 7/2010 |
| JP | 2013-067322 A | 4/2013 |

* cited by examiner

LIGHT EMITTING DEVICE

CROSS-REFERENCE TO RELATED APPLICATIONS

This application is based on and claims priority under 35 USC 119 from Japanese Patent Application No. 2019-092375 filed on May 15, 2019, the contents of which are incorporated herein by reference.

TECHNICAL FIELD

The present disclosure relates to a light emitting device which is provided inside a slide rail for vehicle.

BACKGROUND ART

In the related art, a signal transmission and reception device described in JP2013-067322A has been proposed as the light emitting device described above. According to the signal transmission and reception device described above, an LED (light emitter) is attached to a lower surface of a slide seat, and to an upper rail slidably attached to a slide rail. Information on an electronic device such as a seating sensor provided in the slide seat is transmitted using the LED.

However, according to the light emitting device described above, the LED slides inside the slide rail in which a large amount of grease is applied. Therefore, the grease in the slide rail may adhere to the LED, and communication performance may decrease due to influence of scattering, shielding, or the like of light which is caused by the grease.

SUMMARY OF INVENTION

The present disclosure is to provide a light emitting device capable of preventing a decrease in the communication performance.

According to a first illustrative aspect of the present disclosure, a light emitting device includes a light emitter, a holding portion that slidably holds the light emitter inside a slide rail for a vehicle, and a light transmissive cover that covers the light emitter.

According to a second illustrative aspect of the present disclosure, the cover has a tubular shape, an opening is formed in the cover, and a direction in which the opening extends is an irradiation direction in which a light is emitted from the light emitter.

According to a third illustrative aspect of the present disclosure, the cover has a bottomed tubular shape, and a bottom portion covering the light emitter is formed in the cover at a position to face the light emitter in an irradiation direction of the light emitter, the irradiation direction being a direction in which the light emitter emits a light towards the bottom portion.

According to a fourth illustrative aspect of the present disclosure, the bottom portion of the cover has a shape that a protrusion amount protruding towards an irradiation direction increases as the bottom portion approaches a central axis of the light emitter on which the light of the light emitter becomes strongest.

According to the first illustrative aspect, since the cover is provided, influence of the grease can be reduced, and a decrease in communication performance can be prevented.

According to the second illustrative aspect, since the cover is provided in a tubular shape and is open on the irradiation direction side of the light emitter, the influence of the grease adhered to the cover can be reduced, and the decrease in the communication performance can be prevented.

According to the third illustrative aspect, the cover is provided in a bottomed tubular shape and has a bottom portion that covers the irradiation direction side of the light emitter. The grease is less likely to be applied over the entire bottom portion since the bottom portion of the cover is larger than the light emitter, and the decrease in the communication performance can be prevented.

According to the fourth illustrative aspect, the bottom portion of the cover is provided in such a shape that the protrusion amount in the irradiation direction increases as the bottom portion approaches the central axis along which the strongest light of the light emitter is emitted. Therefore, the grease is less likely to adhere to a portion of the cover which intersects the central axis, and the decrease in the communication performance can be prevented.

According to the present disclosure, it is possible to provide a light emitting device capable of reducing influence of grease and preventing a decrease in communication performance.

The present disclosure is briefly described as above. Further, details of the present disclosure will be clarified by reading a mode for carrying out the present disclosure (hereinafter, referred to as "embodiments") described below with reference to the accompanying drawings.

DESCRIPTION OF EMBODIMENTS

Specific embodiments of the present disclosure will be described below with reference to the drawings.

Figure 1:
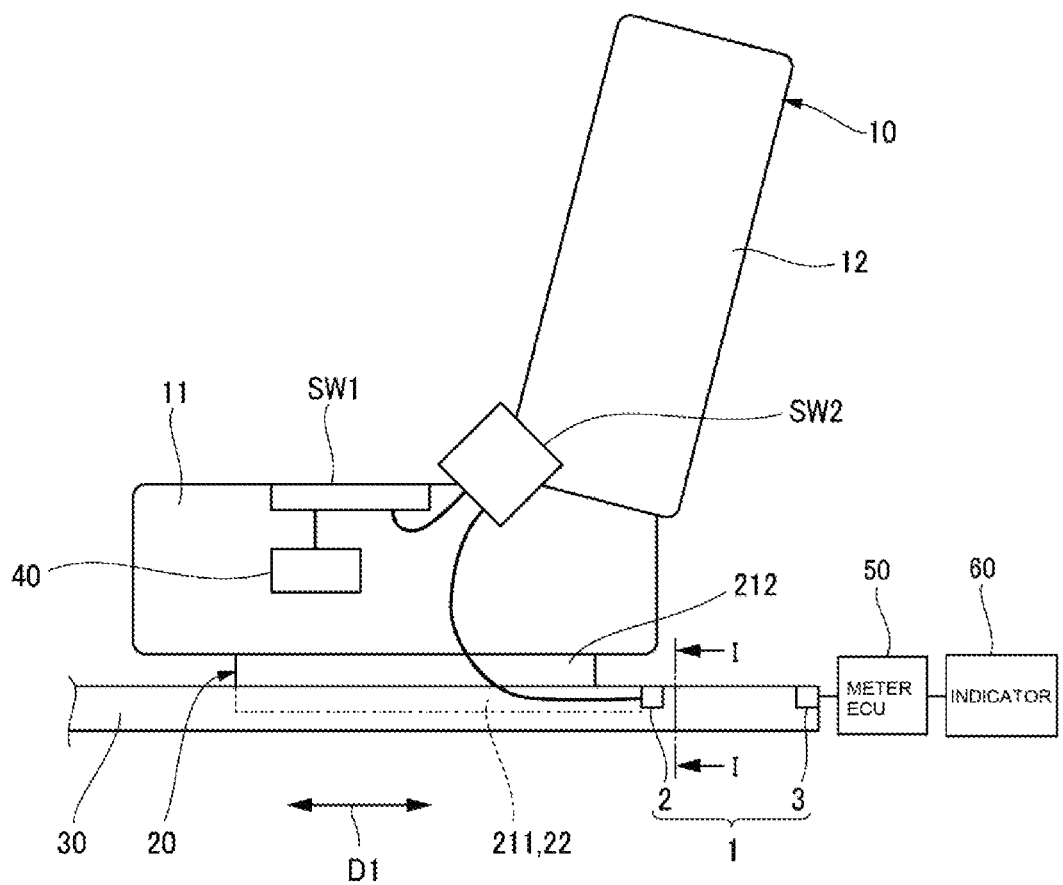
FIG. 1 is a schematic side view illustrating an embodiment of a slide seat to which a communication system incorporating a light emitting device of the present disclosure is attached.

As illustrated in FIG. 1, a communication system 1 includes a light emitting device 2 of the present disclosure and a light receiving device 3. The communication system 1 of the present embodiment is an optical communication system for transmitting information on an electronic device (a seating switch SW1 and a buckle switch SW2 in the present embodiment) mounted on a vehicle slide seat 10 to an electronic device (a meter ECU 50 in the present embodiment) provided on a vehicle body side.

The slide seat 10 mainly includes a seat cushion 11 and a seat back 12. With an upper rail 20 that is attached to a lower surface of the seat cushion 11, and with a slide rail 30 that is disposed below the seat cushion 11 and to which the upper rail 20 is slidably attached, the slide seat 10 is slidable along a longitudinal direction D1 of the slide rail 30.

In the present embodiment, the slide seat 10 is provided with the seating switch SW1, the buckle switch SW2, and a battery 40.

The seating switch SW1 is one of electronic devices mounted on the slide seat 10. The seating switch SW1 is, for example, disposed in the seat cushion 11, is pressed to be turned ON when an occupant sits on the slide seat 10, and is turned OFF when the occupant gets out of the slide seat 10.

The buckle switch SW2 is one of the electronic devices mounted on the slide seat 10. The buckle switch SW2 is provided in a buckle of a seat belt, is turned OFF when a tongue is inserted into the buckle of the seat belt, and is turned ON when the tongue is pulled out.

Figure 2:
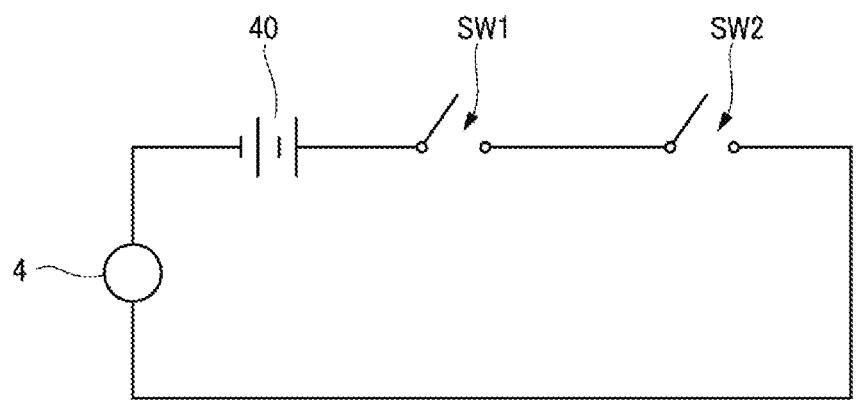
FIG. 2 is an electrical configuration diagram illustrating a battery, a seating switch, a buckle switch, and an LED which are illustrated in FIG. 1.

As illustrated in FIG. 2, the battery 40 supplies power to a light emitting diode (hereinafter referred to as "LED") 4 serving as a light emitter of the light emitting device 2, which will be described below, via the seating switch SW1 and the buckle switch SW2 that are connected in series.

Figure 3:
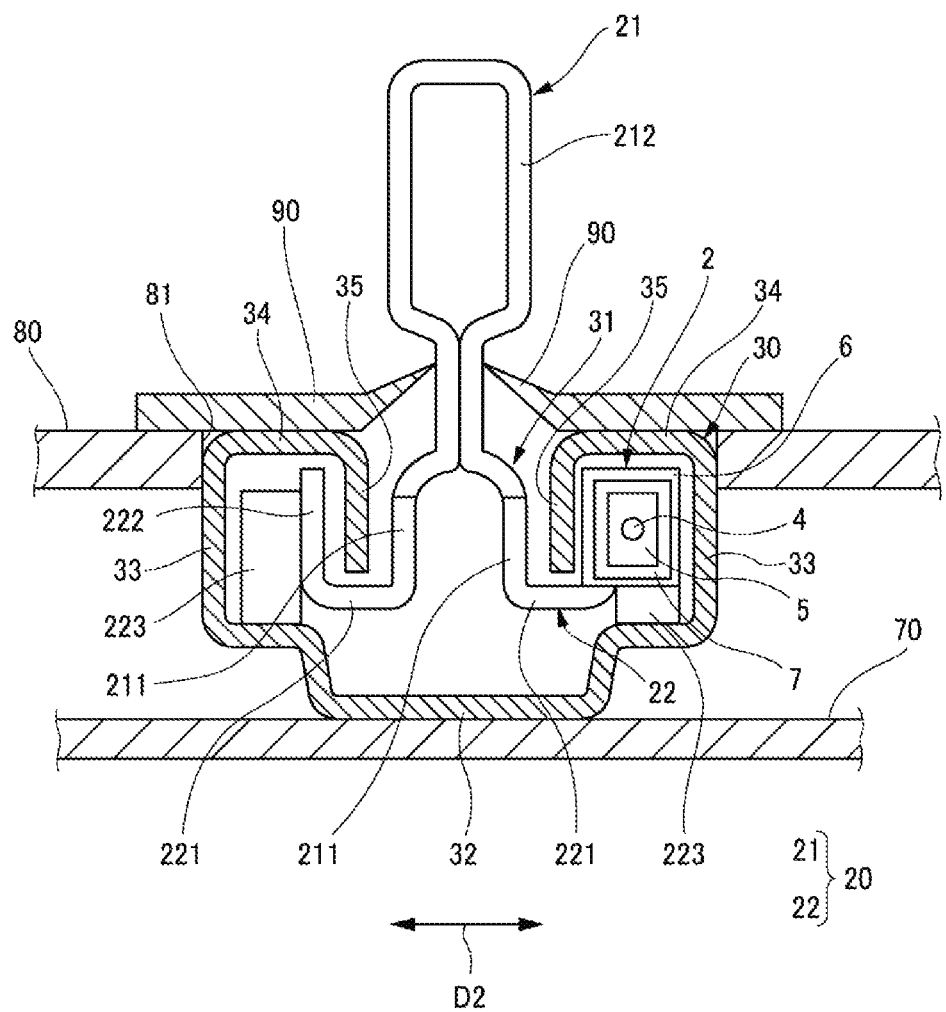
FIG. 3 is a partial cross-sectional view taken along a line I-I of FIG. 1.

The upper rail 20 is obtained by subjecting a metal plate to roll forming, pressing, welding, and the like. As illustrated in FIG. 3, the upper rail 20 is positioned outside the slide rail 30, and includes a seat attachment portion 21 to which the slide seat 10 is attached, and a slide portion 22 positioned inside the slide rail 30.

Next, the slide rail 30 will be described before describing details of the upper rail 20. The slide rail 30 is formed in an elongated tubular shape with a metal plate, and a slit 31 extending in the longitudinal direction D1 is formed in an upper surface thereof. The seat attachment portion 21 of the upper rail 20 protrudes from the slit 31 to the outside of the slide rail 30.

The slide rail 30 has a bottom wall 32 provided in an elongated shape in the longitudinal direction D1, a pair of side walls 33, a pair of upper walls 34, and a pair of inner walls 35. The bottom wall 32 overlaps with a floor panel 70 of an automobile. The pair of side walls 33 is erected from both ends in a width direction D2 of the bottom wall 32. The pair of upper walls 34 extends in directions to approach each other from upper ends of the pair of side walls 33. The pair of inner walls 35 sags from end portions, of the pair of upper walls 34, separated from the side walls 33. The slide rail 30 is formed to have the same cross-sectional shape from one end all along to the other end in the longitudinal direction D1.

Grease is applied to an upper surface of the bottom wall 32, inner side surfaces in the width direction D2 of the pair of side walls 33, lower surfaces of the pair of upper walls 34, and outer side surfaces in the width direction D2 of the pair of inner walls, all of which define an inside of the slide rail 30, so that the upper rail 20 is easy to slide. The slit 31 refers to a space between the pair of inner walls 35.

A mat 80 is disposed above the floor panel 70, and the upper wall 34 of the slide rail 30 is exposed from a slit 81 provided in the mat 80. A pair of moors 90 is attached to the pair of upper walls 34 of the slide rail 30. The pair of moors 90 covers the slit 31 to prevent foreign matters from entering the slide rail 30. An attachment body 212, which will be described below, of the seat attachment portion 21 of the upper rail 20 passes between the pair of moors 90 and protrudes from below the moors 90 to above the moors 90.

Next, details of the upper rail 20 will be described. The seat attachment portion 21 includes a pair of outer side walls 211 and the attachment body 212. The pair of outer side walls 211 is arranged side by side in the width direction D2 between the pair of inner walls 35, that is, in the slit 31. The attachment body 212 is bent in a substantially rectangular tube shape and is connected to upper ends of the pair of outer side walls 211. As illustrated in FIG. 1, the attachment body 212 is provided to be shorter than the pair of outer side walls 211 in the longitudinal direction D1; the pair of outer side walls 211, and the slide portion 22 to be described below, protrude more than the attachment body 212 at one end side in the longitudinal direction D1.

As illustrated in FIG. 3, the slide portion 22 has a pair of bottom walls 221 that are provided in an elongated shape in the longitudinal direction D1 and a pair of inner side walls 222. The pair of bottom walls 221 is arranged on a lower side of lower ends of the pair of inner walls 35, and the pair of outer side walls 211 is erected from end portions thereof on an inner side in the width direction D2. The pair of inner side walls 222 is erected from an outer side in the width direction D2 of the bottom walls 221 and is arranged inside the slide rail 30. Wheels 223 running on the bottom wall 32 of the slide rail 30 are attached on an outer side in the width direction D2 of the inner side walls 222.

Figure 4:
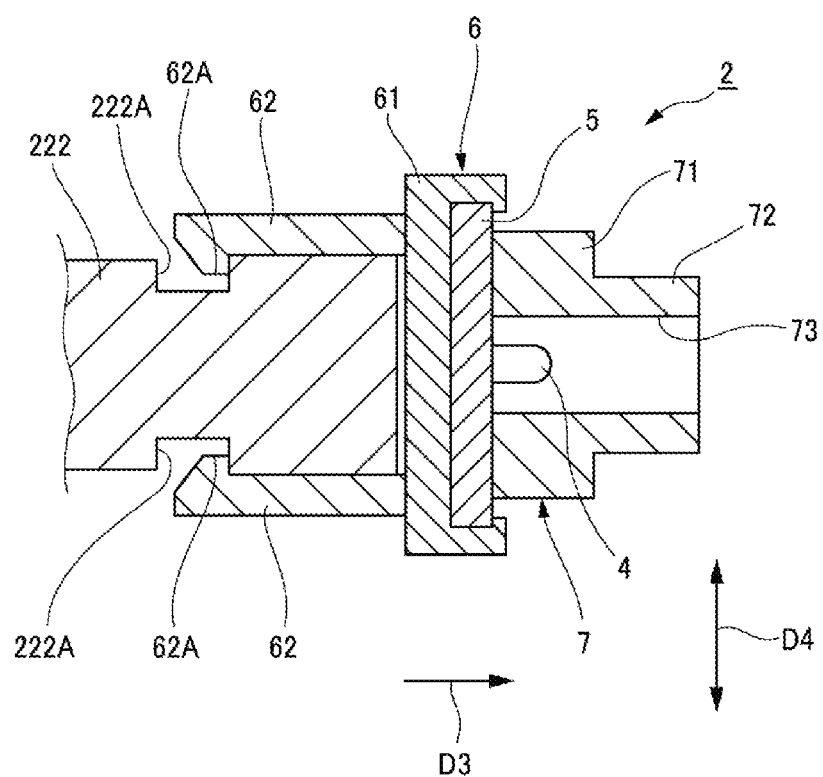
FIG. 4 is a schematic cross-sectional view of a light emitting device and an upper rail illustrated in FIG. 1.

As illustrated in FIGS. 3 and 4, the light emitting device 2 includes an LED 4, a substrate 5 on which the LED 4 is mounted, a holding portion 6 that slidably holds the substrate 5 inside the slide rail 30, and a light transmissive cover 7 that covers the LED 4. As illustrated in FIG. 2, the LED 4 is connected to the battery 40 via the seating switch SW1 and the buckle switch SW2. Accordingly, when an occupant is seated and the seat belt is not worn, both the seating switch SW1 and the buckle switch SW2 are turned on, power is supplied from the battery 40 to the LED 4, and the LED 4 emits light. The LED 4 is held by the holding portion 6, which will be described below, such that an irradiation direction D3 thereof is along the longitudinal direction D1 of the slide rail 30.

The substrate 5 is provided in a substantially rectangular shape as viewed from the top, and is disposed inside the slide rail 30 to be perpendicular to the longitudinal direction D1.

The holding portion 6 is formed of a synthetic resin. As illustrated in FIG. 4, the holding portion 6 includes a holding body 61 that holds the substrate 5, and a pair of locking arms 62 that are locked to one of the pair of inner side walls 222. The holding body 61 is attached to the substrate 5 so as to cover a side opposite to the LED 4 of the substrate 5.

The pair of locking arms 62 protrude from the holding body 61 toward a side opposite to the irradiation direction D3, and a pair of locking claws 62A protruding in an upper-lower direction D4 are provided at tip ends of the pair of locking arms 62. One of the pair of inner side walls 222 (one on the right side in the example illustrated in FIG. 3) is provided with cutouts 222A for locking the locking claws 62A of the locking arms 62. The cutouts 222A are provided at an upper end and a lower end of the inner side wall 222, respectively. The pair of locking arms 62 is provided side by side in the upper-lower direction D4. One of the locking claws 62A protruding toward a lower side is provided at the tip end of the locking arm 62 on an upper side, and the other locking claw 62A protruding toward an upper side is provided at the tip end of the locking arm 62 on a lower side.

When the inner side wall 222 is vertically sandwiched between the pair of locking arms 62, the locking arm 62 on the upper side is locked to the cutout 222A provided at the upper end of the inner side wall 222. Further, the locking arm 62 on the lower side is locked to the cutout 222A provided at the lower end of the inner side wall 222.

Accordingly, as illustrated in FIG. 3, the holding portion 6 is accommodated in a space surrounded by the inner wall 35, the upper wall 34, the side wall 33, and the bottom wall 32 which are on the right side of the slide rail 30. The substrate 5 of the holding portion 6 is disposed on one end side in the longitudinal direction D1 of the slide portion 22 (inner side wall 222) of the upper rail 20.

By locking the holding portion 6 to the upper rail 20 as described above, the holding portion 6 slides in conjunction with sliding of the upper rail 20 and of the slide seat 10. The LED 4 is held by the holding portion 6 as described above, and is disposed inside the slide rail 30.

Figure 5:
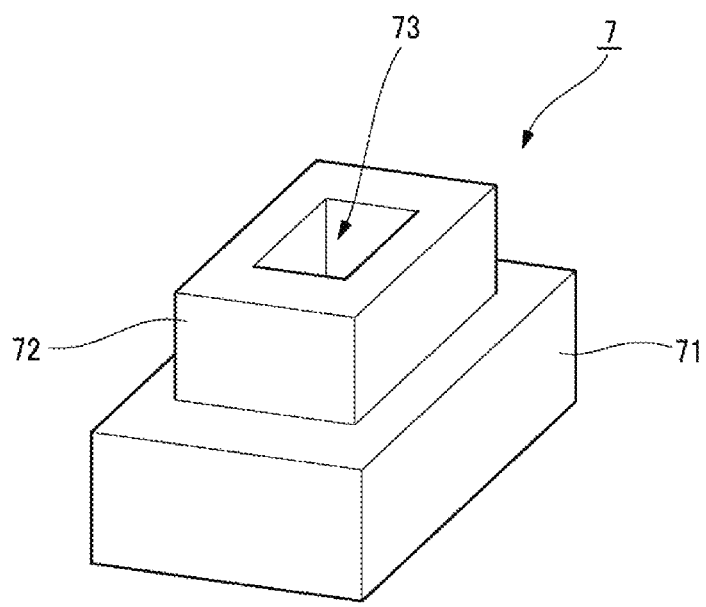
FIG. 5 is a perspective view of a cover illustrated in FIG. 4.

The cover 7 is formed of a light transmissive member such as glass or acrylic. As illustrated in FIGS. 4 and 5, the cover 7 is provided in a rectangular tube shape and is open on an irradiation direction D3 side of the LED 4. In the present embodiment, the cover 7 is also open on a side opposite to the irradiation direction D3 side. More specifically, the cover 7 includes a large rectangular tube portion 71 provided on the side opposite to the irradiation direction D3 side, and a small rectangular tube portion 72 that is smaller than the large rectangular tube portion 71 and that is provided on the irradiation direction D3 side. Holes 73 of the large rectangular tube portion 71 and the small rectangular tube portion 72 have the same size. The LED 4 is entirely accommodated inside the cover 7.

The light receiving device 3 has a photodiode (not illustrated). As illustrated in FIG. 1, the light receiving device 3 is introduced inside the slide rail 30 from an opening at one end in the longitudinal direction D1 of the slide rail 30 and is fixed to one end portion thereof. Accordingly, the LED 4 of the light emitting device 2 and the photodiode of the light receiving device 3 can be disposed to face each other in the longitudinal direction D1. The photodiode detects light emitted from the LED 4, and notifies the meter ECU 50 that the occupant is seated and the seat belt is not worn. In a case where the light receiving device 3 detects light emitted from the LED 4 when an ignition is turned on and a vehicle speed is, for example, equal to or greater than 3 km/h, the meter ECU 50 determines that the occupant is not wearing the seat belt, and displays that as a warning on an indicator 60.

According to the embodiment described above, by providing the cover 7 that covers the LED 4, the influence of the grease can be reduced, and the decrease in the communication performance can be prevented.

According to the embodiment described above, the cover 7 is provided in a tubular shape and is open on the irradiation direction D3 side of the LED 4. For this reason, since the cover 7 is not provided on the irradiation direction D3 side of the LED 4, the influence of the grease adhered to the cover 7 can be reduced, and the decrease in the communication performance can be prevented.

The present disclosure is not limited to the embodiment described above and may be appropriately modified, improved, or the like. In addition, the material, shape, size, number, arrangement position and the like of each component in the embodiment described above are optional and are not limited as long as the present disclosure can be achieved.

Figure 6:
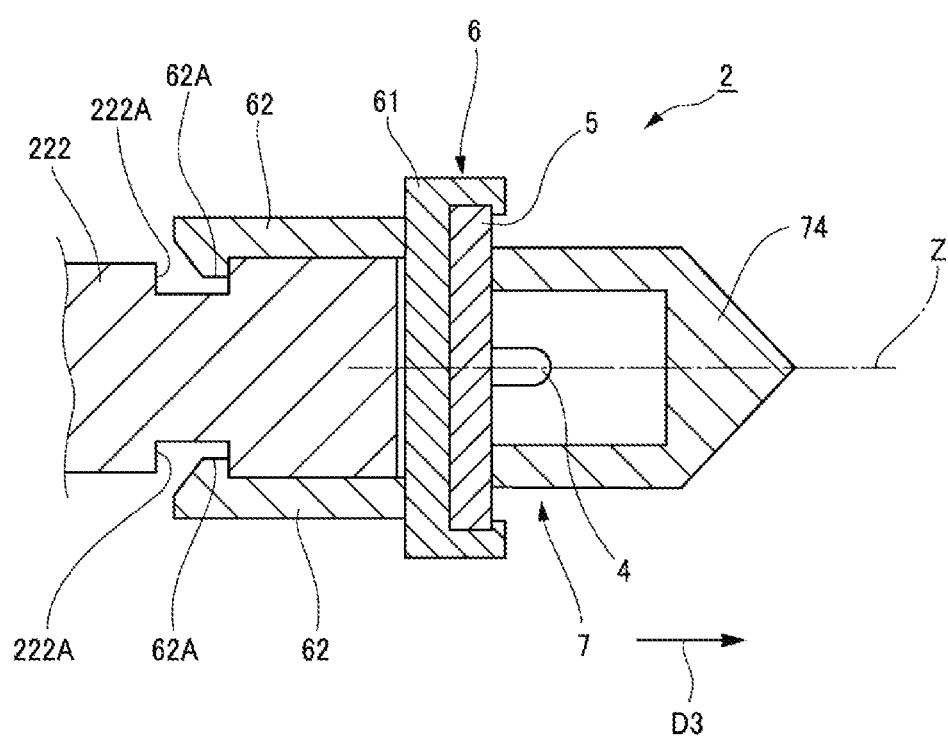
FIG. 6 is a schematic cross-sectional view of the light emitting device and the upper rail illustrated in FIG. 1 according to another embodiment.
Figure 7:
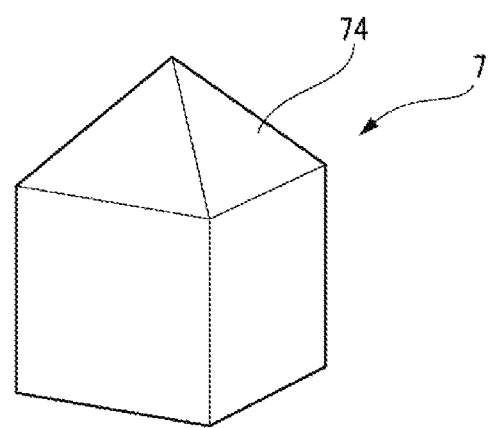
FIG. 7 is a perspective view of a cover illustrated in FIG. 6.

That is, according to the embodiment described above, the cover 7 is formed in a tubular shape and is open on the irradiation direction D3 side of the LED 4, and the present disclosure is not limited thereto. As illustrated in FIGS. 6 and 7, the cover 7 may be provided in a bottomed tubular shape and have a bottom portion 74 that covers the irradiation direction D3 side of the LED 4, and the bottom portion 74 of the cover 7 may be provided in such a shape that a protrusion amount in the irradiation direction D3 increases as it approaches a central axis Z along which the strongest light of the LED 4 is emitted. As illustrated in FIG. 7, in the present embodiment, the bottom portion 74 is provided in a quadrangular pyramid shape.

By providing the cover in such a shape, grease is less likely to adhere to a portion of the bottom portion 74 of the cover 7 which intersects the central axis Z, and a decrease in communication performance can be prevented. With respect to the shape of the bottom portion 74, the grease is less likely to adhere to the apex as an apex that intersects the central axis Z gets sharper, and the decrease in the communication performance can be further prevented.

Further, according to the embodiment illustrated in FIG. 7, the bottom portion 74 of the cover 7 is provided in such a shape that the protrusion amount in the irradiation direction D3 increases as it approaches a central axis Z along which the strongest light of the LED 4 is emitted, and the present disclosure is not limited thereto. The bottom portion 74 may be provided to be flat. When the grease adheres to the entire bottom portion 74 of the cover 7, the communication performance rapidly drops. However, even if the bottom portion 74 of the cover 7 is flat as described above, it is almost impossible that the grease adheres to the entire bottom portion 74 since the bottom portion 74 of the cover 7 is larger than the LED 4. Therefore, even in a case where the bottom portion 74 is provided to be flat, a decrease in communication performance can be prevented as compared with a case where the cover 7 is not provided.

Further, according to the embodiment described above, the holding portion 6 is locked to the upper rail 20 by the locking arm 62, and the present disclosure is not limited thereto. The holding portion 6 may be fixed to the upper rail 20 by a bolt, a nut, or the like.

Further, according to the embodiment described above, the LED 4 is connected to the battery 40 via the seating switch SW1 and via the buckle switch SW2, and the present disclosure is not limited thereto. For example, a control unit of the LED 4 such as a microcomputer may be provided on the substrate 5, and the control unit may control light emission of the LED 4 according to states of the seating switch SW1 and the buckle switch SW2.

Illustrative aspects according to the present disclosure is described hereinafter.

According to an illustrative aspect of the present disclosure, a light emitting device (2) includes a light emitter (4), a holding portion (6) that slidably holds the light emitter (4) inside a slide rail (30) for a vehicle, and a light transmissive cover (7) that covers the light emitter (4).

According to another illustrative aspect of the present disclosure, the cover (7) has a tubular shape, an opening is formed in the cover, and a direction in which the opening extends is an irradiation direction (D3) in which a light is emitted from the light emitter (4).

According to another illustrative aspect of the present disclosure, the cover (7) has a bottomed tubular shape, and a bottom portion (74) covering the light emitter (4) is formed in the cover (7) at a position to face the light emitter (4) in an irradiation direction (D3) of the light emitter (4), the irradiation direction (D3) being a direction in which the light emitter (4) emits a light towards the bottom portion (74).

According to another illustrative aspect of the present disclosure, the bottom portion (74) of the cover (7) has a shape that a protrusion amount protruding towards an irradiation direction (D3) increases as the bottom portion (74) approaches a central axis (Z) of the light emitter (4) on which the light of the light emitter (4) becomes strongest.

According to another illustrative aspect of the present disclosure, the bottom portion (74) includes a plurality of outer surfaces, and the plurality of outer surfaces intersect with each other at a sharp angle.

According to another illustrative aspect of the present disclosure, the tubular shape of the cover (7) is a rectangular tubular shape. The cover (7) includes a large rectangular tube portion (71) and a small rectangular tube portion (72) that is smaller than the large rectangular tube portion (71), along the irradiation direction (D3) of the light emitter (4).

According to another illustrative aspect of the present disclosure, the opening of the cover (7) is a through hole (73) extending in the irradiation direction (D3). The through hole (73) penetrates the large rectangular tube portion (71) and the small rectangular tube portion (72), in the irradiation direction (D3). A dimension of the through hole (73) in the large rectangular tube portion (71) and a dimension of the through hole (73) in the small rectangular tube portion (72) are same.

According to another illustrative aspect of the present disclosure, the holding portion (6) includes a pair of locking arms (62) which protrudes towards an opposite direction to the irradiation direction of the light emitter (4), and a locking claw (62A) which is respectively provided at tip ends of the pair of locking arms (62), the pair of locking arms (62) being flexible. The locking claw (62A) is configured such that the pair of locking arms (62) are locked to the slide rail (30).

What is claimed is:

1. A light emitting device, comprising:
a light emitter;
a holding portion that slidably holds the light emitter inside a slide rail for a vehicle; and
a light transmissive cover that covers the light emitter and has a rectangular tube shape,
wherein light is emitted from the light emitter, and an irradiation direction of the light emitter is parallel to a slide direction in which the holding portion slides along the slide rail,
wherein an opening extending in the irradiation direction is formed in the cover,
wherein the cover includes a rectangular tube portion extending along the irradiation direction of the light emitter,
wherein the opening of the cover is a through hole extending in the irradiation direction, the through hole penetrating the rectangular tube portion in the irradiation direction,
wherein the cover is formed of a light transmissive member,
wherein the cover is provided to cover a lateral side of the light emitter facing an inner wall surface of the slide rail, the inner wall surface being located at a circumference of the light emitter arranged inside the slide rail, and the inner wall surface extending in the slide direction, and
wherein the light emitter arranged inside the slide rail is entirely accommodated in the cover.

2. The light emitting device according to claim 1, wherein the cover includes a large rectangular tube portion and a small rectangular tube portion that is smaller than the large rectangular tube portion, along the irradiation direction of the light emitter.

3. The light emitting device according to claim 2,
wherein the through hole penetrates the large rectangular tube portion and the small rectangular tube portion, in the irradiation direction, and
wherein a dimension of the through hole in the large rectangular tube portion and a dimension of the through hole in the small rectangular tube portion are same.

4. The light emitting device according to claim 1, wherein the holding portion includes a pair of locking arms which protrudes towards a direction opposite to the irradiation direction, and a locking claw which is respectively provided at tip ends of the pair of locking arms, the pair of locking arms being flexible, and
wherein the locking claw is configured such that the pair of locking arms is locked to the slide rail.

5. The light emitting device according to claim 1, wherein the cover consists of the light transmissive member.

6. A light emitting device, comprising:
a light emitter;
a holding portion that slidably holds the light emitter inside a slide rail for a vehicle; and
a light transmissive cover that covers the light emitter and has a bottomed tube shape,
wherein light is emitted from the light emitter, and an irradiation direction of the light emitter is parallel to a slide direction in which the holding portion slides along the slide rail,
wherein an opening extending in the irradiation direction is formed in the cover,
wherein the cover includes a flat bottom portion at an end of the cover that faces the light emitter in the irradiation direction, the flat bottom portion of the cover being larger than the light emitter,
wherein the cover is formed of a light transmissive member,
wherein the cover is provided to cover a lateral side of the light emitter facing an inner wall surface of the slide rail, the inner wall surface being located at a circumference of the light emitter arranged inside the slide rail, and the inner wall surface extending in the slide direction, and
wherein the light emitter arranged inside the slide rail is entirely accommodated in the cover.

7. The light emitting device according to claim 6, wherein the holding portion includes a pair of locking arms which protrudes towards an opposite direction to the irradiation direction of the light emitter, and a locking claw which is respectively provided at tip ends of the pair of locking arms, the pair of locking arms being flexible, and
wherein the locking claw is configured such that the pair of locking arms is locked to the slide rail.

8. The light emitting device according to claim 6, wherein the cover consists of the light transmissive member.

9. A light emitting device, comprising:
a light emitter;
a holding portion that slidably holds the light emitter inside a slide rail for a vehicle; and
a light transmissive cover that covers the light emitter and has a bottomed tube shape,
wherein light is emitted from the light emitter, and an irradiation direction of the light emitter is parallel to a slide direction in which the holding portion slides along the slide rail,
wherein the cover includes a bottom portion at an end of the cover that faces the light emitter in the irradiation direction, the irradiation direction being a direction in which the light emitter emits light towards the bottom portion,
wherein the bottom portion includes a plurality of outer surfaces, the plurality of outer surfaces intersecting with each other at a sharp angle,
wherein the cover is formed of a light transmissive member, wherein the cover is provided to cover a lateral side of the light emitter facing an inner wall surface of the slide rail, the inner wall surface being located at a circumference of the light emitter arranged inside the slide rail, and the inner wall surface extending in the slide direction, and wherein the light emitter arranged inside the slide rail is entirely accommodated in the cover.

10. The light emitting device according to claim 9, wherein the cover consists of the light transmissive member.

* * * * *